Jan. 20, 1959 — C. E. SCHMIDT — 2,869,587
REED FRAME
Filed May 31, 1956
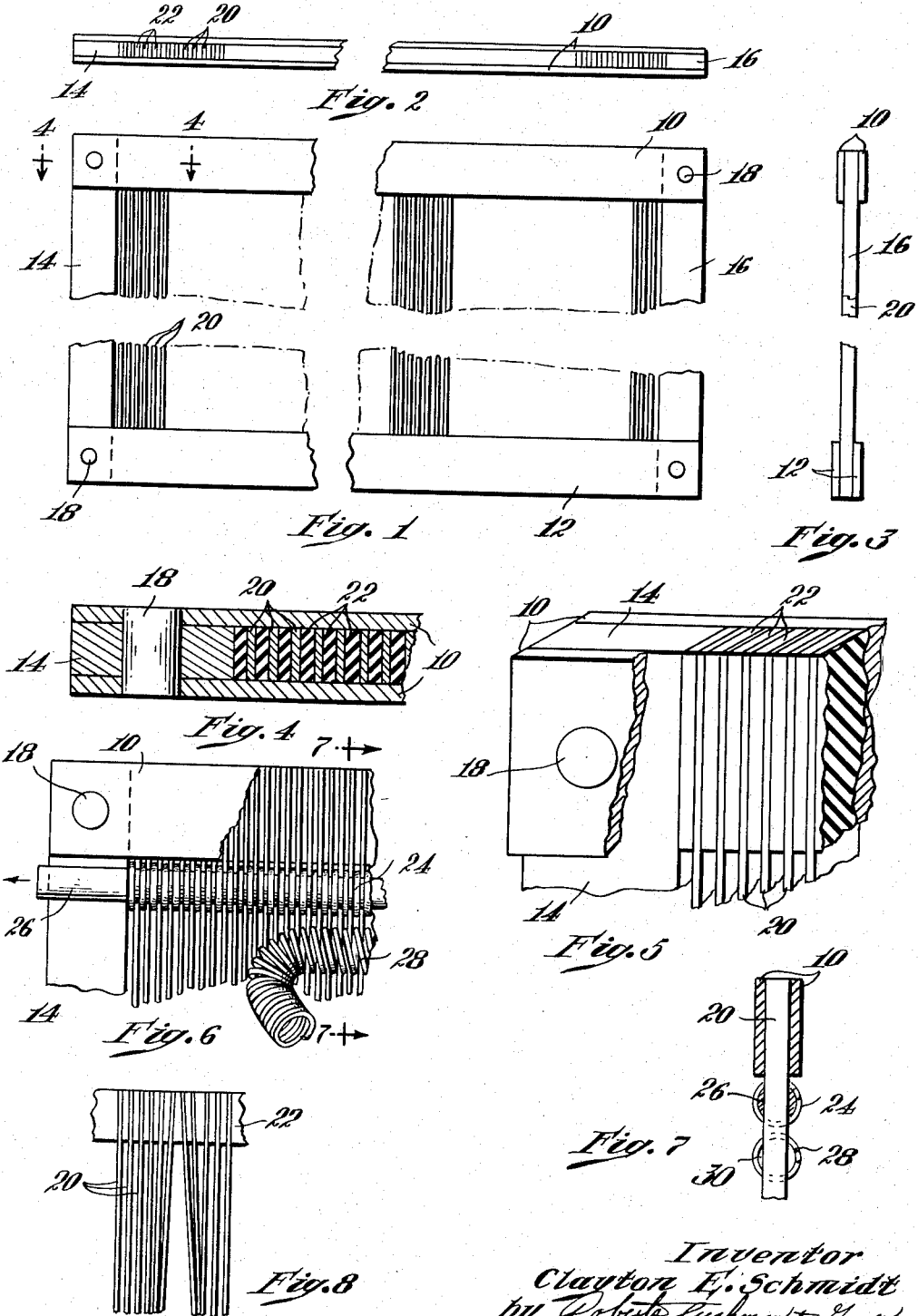
Inventor
Clayton E. Schmidt
by Roberts, Cushman & Grover
Att'ys

United States Patent Office 2,869,587
Patented Jan. 20, 1959

2,869,587

REED FRAME

Clayton E. Schmidt, New Bedford, Mass., assignor to Schmidt Mfg. Co., New Bedford, Mass., a corporation of Massachusetts Application May 31, 1956, Serial No. 588,318

3 Claims. (Cl. 139—192)

This invention relates to loom reeds and has for its principal objects to provide a reed in which the dent wires are yieldably supported at their ends; to provide a reed in which the dent wires are yieldably held in uniformly spaced relation without need for a coiled wire spacing spring and with their edges in plane surfaces so as not to be abrasive to the passage of a shuttle therealong; to provide a reed in which the dent wires are supported in such fashion as to deaden communication of synthetic vibrations from one dent wire to the next; to provide a reed in which there is flexibility throughout the entire length of the dent wires including the anchored end portions thus eliminating high bending stresses at their junction with the anchoring material and hence lessening the frequency of failure; to provide a reed in which deflection of the dent wires by passage of slubs will not result in permanent distortion of the dent wires; to provide a reed in which the dent wires are sufficiently yieldable to receive an accidental impact without permanent distortion; and to provide a reed in which the frame is of sufficient flexibility to absorb twisting stresses and/or shock without permanent damage. Another object is to provide a method of making a reed which does not require the use of a metal solder as a bonding material hence avoiding all of the disadvantages inherent in soldering operations such as preliminary cleaning and fluxing, handling of molten solder which is dangerous, high temperatures which draw the temper of the wires and distorts them, uneven setting up of the bonding material which causes misalignment of the wires, cleaning to remove the molten solder spilled on the wires, realignment of the wires to compensate for unevenness, regrinding and sanding to remove the unevenness which cannot be compensated for by realignment and rerubbing to remove the sharp corners produced by grinding. Other objects are to provide a method which may be carried out with a minimum of equipment; at room temperatures without special skill; without disturbing the dent wires during the bonding operation; and hence without requiring realignment and/or resurfacing which is inexpensive and which provides an effective and permanent bond.

As herein illustrated the reed has a substantially rectangular frame in which there are top and bottom rails held in spaced parallel relation by end members, each rail comprising a pair of transversely spaced bars. Dent wires are disposed in parallel relation between the rails with their ends lodged between the parallel bars and in accordance with the invention the ends of the wires are anchored between the bars by an elastic matrix comprised preferably of a two-part, polysulphide liquid polymer, chemically curing elastomer. The dent wires are anchored in place solely by the matrix without the spirally wound spring members usually employed and hence are yieldable throughout their unsupported lengths and within the matrix.

According to the method of manufacture the ends of the wires are placed between the spaced bars at the top and bottom of the frame, a spacer member in the form of a close wound spring is applied to the wires adjacent the bars to hold them in spaced relation, and then liquid bonding material is applied by pouring, brushing or spraying to fill the spaces between the ends of the wires within the bars. The bonding material is of a self-curing kind which will set up without shrinking that is, polymerize without application of heat within a predetermined length of time. After polymerization commences but before it is completed the spring spacer is removed whereupon the assembly is left until the anchoring material completes polymerizes. Since the material is non-shrinking deflection and/or misalignment of the wires is avoided. Preferably two spring spacers are employed, placed next to the top and bottom bars, the one closest to the bar providing a barrier to prevent flow of the liquid component along the wires. The barrier springs are removed after polymerization is completed and there is then no danger of misalignment of the wires.

The invention will not be described in greater detail with reference to the accompanying drawings wherein:

Fig. 1 is a plan view of the loom reed broken away to shorten it up both in length and width;

Fig. 2 is an elevation of a longitudinal edge of the reed;

Fig. 3 is an elevation of a transverse edge of the reed;

Fig. 4 is an enlarged fragmentary section taken on the line 4—4 of Fig. 1;

Fig. 5 is an enlarged fragmentary perspective at one corner of the reed with portions broken away to show the upper ends of the dent wires embedded in the elastic matrix;

Fig. 6 is a plan view of a fragmentary portion of the reed frame at one corner broken away in part to illustrate the method of manufacture;

Fig. 7 is an edge view as seen from the left-hand edge of Fig. 6; and

Fig. 8 is a fragmentary section showing the extent of displacement of the dent wires produced by passage of a thickened portion of thread between them.

Referring to the drawings, the reed frame is of rectangular construction being comprised of parallel spaced rails 10 and 12 supported in spaced relation by end members 14 and 16, the parts being joined at the four corners by rivets 18. The rails 10 and 12 are constituted by a pair of spaced parallel bars between which the opposite ends of the members 14 and 16 are sandwiched and which provide spaces within the opposite ends of a plurality of dent wires 20 may be disposed and anchored. As illustrated, the dent wires 20 are arranged in uniformly spaced parallel relation longitudinally of the frame with their opposite ends lodged between the plates 10 and 12. The ends of the dent wires are anchored in place by a matrix 22, as shown in Figs. 4 and 5, which is elastic and provides a strong bond which anchors the ends in place and yet permits the portions of the wires buried in the matrix to yield with respect to each other, as for example as shown in Fig. 8. As illustrated, it is evident that the anchor for the ends of the dent wires is constituted solely by the bonding matrix material 22. Consequently in contrast to ordinary reed construction which embodies one or more spacing members adjacent the rails to which the dent wires are welded or cemented, the dent wires in the present structure are permitted much greater flexibility. This flexibility extends up into the matrix itself so that embedded ends of the wires yield thus eliminating high bending stresses in the wires where they emerge from the matrix and consequent failure at these points.

The reed is manufactured by setting up the frame members 10, 12, 14 and 16, inserting the dent wires 20 so that their ends lie between the spaced bars 10 and 12 in uniformly spaced and parallel relation and then filling the spaces between the ends of the dent wires which are sandwiched between the bars 10 and 12 with a liquid matrix material which will polymerize at room temperatures without shrinkage. For best results the material used is a two-part polysulphide liquid polymer, chemically curing elastomer. The liquid bond may be applied by pouring, spraying or brushing into the spaces between the dent wires and the bars, and if desired polymerization may be hastened by subjecting the assembly to a low heat not above 130° F. At this low temperature the dent wires do not expand sufficiently to spoil their initial alignment and hence hand finishing is not required to smooth the surfaces after the matrix is completely cured. Preferably, however, a bonding compound is employed which cures at room temperatures.

The dent wires are held uniformly spaced during application of the bonding compound by means of a conventional coiled spring 24 such as is ordinarily used in the reed and becomes a component part of the anchorage for the ends of the dent wires. This spring has close wound, substantially parallel coils and is applied by laying it against the face of the wires and pressing it through them to a substantially midplane so that one wire lies within each convolution of the spring. When pressed through to a midplane a pair of long thin bars 26 (Figs. 6 and 7) of segmental cross-section are forced through the spring at opposite sides of the dent wires thereby to lock the dent wires rigidly in alignment. After the springs 24 have been applied the liquid matrix is applied to the ends of the wires so as to fill up completely the spaces between the bars 10 and 12 and between the ends of the wires. This liquid will flow as far as the spring 24 but will be stopped by it so that it does not flow along the wires intermediate the frame members. After the matrix material commences to polymerize but before it is completely polymerized the rods 26 are withdrawn and the spring 24 so that it will not become permanently bonded to the wires. While it is possible to proceed with the use of one spring 24 better results can be obtained by applying two springs that is, in addition to the spring 24 a second spring 28, the latter being located inwardly of the spring 24. When two springs are used the spring 24 serves as a barrier which prevents the liquid from reaching the second spring and may be removed just as soon as polymerization has taken place for a long enough time to prevent free running. The spring 28 is relied upon to hold the wires accurately in spaced relation with each other during the final stages of polymerization. When polymerization is completed the second spring 28 is also removed so that ultimately the reed has no spring spacer members at its longitudinal edges.

As pointed out previously the reason for omitting the spacing springs is that the advantages of the resilient bonding matrix may thus be fully realized that is, the dent wires are free to flex not only intermediate the frame members but within the bonding material itself thus eliminating high bending stresses and failure at the junction of the wires with the frame members.

Another important advantage resides in the fact that the bars between which the ends of the dent wires are anchored are not rigid as they would be if solder were employed and hence the frame will yield sufficiently to absorb accidental dropping or a blow without permanent damage thereto.

It should be understood that the present disclosure is for the purpose of illustration only and that this invention includes all modifications and equivalents which fall within the scope of the appended claims.

I claim:

1. A loom reed having a substantially rectangular frame including vertically spaced pairs of transversely spaced, parallel bars at the top and bottom, and a series of dent wires disposed within the frame with their ends located respectively between the transversely spaced bars at the top and bottom, characterized in that the dent wires are joined at their ends to the frame exclusively by a resilient matrix filling the spaces between the bars and the dent wires.

2. A loom reed having a substantially rectangular frame including vertically spaced pairs of transversely spaced, parallel bars at the top and bottom, and a series of dent wires disposed within the frame with their ends located respectively between the transversely spaced bars at the top and bottom, characterized in that the ends of the dent wires are anchored to the bars solely by a matrix of elastic material so that the embedded ends of the wires are angularly displaceable with respect to each other within the body of the matrix.

3. A loom reed having a substantially rectangular frame including vertically spaced pairs of transversely spaced, parallel bars at the top and bottom, and a series of dent wires disposed within the frame with their ends located respectively between the transversely spaced bars at the top and bottom, characterized in that the end portions of the wires are anchored solely by an elastic matrix and that the portions of the wires intermediate the end portions are unconstrained.

References Cited in the file of this patent

UNITED STATES PATENTS

| | | |
|---|---|---|
| 1,676,513 | Andrews | July 10, 1928 |
| 1,713,623 | Rea | May 21, 1929 |
| 2,048,001 | Fish | July 21, 1936 |
| 2,466,963 | Patrick et al. | Apr. 12, 1949 |
| 2,544,882 | Hornig | Mar. 13, 1951 |
| 2,643,684 | Taylor | June 30, 1953 |